(12) United States Patent
Zordan

(10) Patent No.: US 7,186,197 B2
(45) Date of Patent: Mar. 6, 2007

(54) ACTUATOR WITH TWO MOTORS, A DIFFERENTIAL REDUCER AND A TORQUE LIMITER

(75) Inventor: Cedric Zordan, Pau (FR)

(73) Assignee: Messier-Bugatti, Villacoublay (FR)

( * ) Notice: Subject to any disclaimer, the term of this patent is extended or adjusted under 35 U.S.C. 154(b) by 81 days.

(21) Appl. No.: 10/515,995

(22) PCT Filed: May 28, 2003

(86) PCT No.: PCT/FR03/01622

§ 371 (c)(1),
(2), (4) Date: Jun. 13, 2005

(87) PCT Pub. No.: WO03/102437

PCT Pub. Date: Dec. 11, 2003

(65) Prior Publication Data

US 2005/0229729 A1    Oct. 20, 2005

(30) Foreign Application Priority Data

May 31, 2002 (FR) .................................. 02 06743

(51) Int. Cl.
*F16H 3/72* (2006.01)
*F16H 57/08* (2006.01)

(52) U.S. Cl. .......................................... 475/5; 475/339

(58) Field of Classification Search .................... 475/5, 475/221, 204, 205, 208, 219, 338, 339; 180/65.1, 180/65.6, 65.7
See application file for complete search history.

(56) References Cited

U.S. PATENT DOCUMENTS

| 1,953,510 | A |   | 4/1934 | Henry et al. |
| 2,517,879 | A | * | 8/1950 | Howard ........................ 475/78 |
| 4,279,177 | A | * | 7/1981 | Yamashita ...................... 475/5 |
| 4,834,319 | A |   | 5/1989 | Ewy et al. |
| 5,396,968 | A | * | 3/1995 | Hasebe et al. .............. 180/65.6 |
| 6,080,077 | A | * | 6/2000 | Kamlukin .................... 475/339 |
| 6,715,291 | B1 | * | 4/2004 | Liao ............................... 475/5 |
| 7,044,877 | B2 | * | 5/2006 | Ai .................................. 475/5 |
| 2003/0162617 | A1 | * | 8/2003 | Minagawa et al. ............ 475/5 |

FOREIGN PATENT DOCUMENTS

FR    1 604 664    1/1972

* cited by examiner

Primary Examiner—Roger Pang
(74) Attorney, Agent, or Firm—Young & Thompson

(57) ABSTRACT

The invention relates to an actuator comprising two drive motors (14A, 14B), an outlet (22), a differential reducer (16) with spur teeth and a torque limiter (18), the latter two components being disposed between the two motors (14A, 14B) and the outlet (22). According to the invention, the torque limiter (18) is built into the differential reducer (16). The invention can be used to anchor a landing gear.

13 Claims, 5 Drawing Sheets

ACTUATOR WITH TWO MOTORS, A DIFFERENTIAL REDUCER AND A TORQUE LIMITER

The present invention relates to an actuator of the type comprising:
two drive motors,
an output member,
a differential reduction gear having straight-cut teeth which is interposed between the two motors and the output member, the differential reduction gear comprising:
two sun pinions, each sun pinion being rotatably coupled to a drive motor,
an output shaft, about which the axes of the sun pinions are rotatably mounted,
a planet-carrying drum which is connected to the output shaft in order to be rotatably driven,
at least one pair of planet pinions which are carried by the planet-carrying drum and which are mounted so as to rotate about themselves, each planet pinion being engaged with a sun pinion, the associated planet pinions of the same pair being engaged with each other,
a torque limiter which is interposed between the two motors and the output member.

Such an actuator is used in particular for locking the undercarriage of an aircraft in a retracted position.

For reasons of reliability, the actuator comprises two motors for driving the output member. A differential reduction gear is arranged therebetween and allows the output member to be driven by the two motors when they operate, even if the speeds thereof are different. Owing to the differential reduction gear, the output member is driven by only one of the motors, should the other motor break down.

In order to prevent any risk of damage to the mechanism of the undercarriage, a torque limiter is provided in the actuator.

Basically, the torque limiter is a differential reduction gear.

The presence in the same actuator of two drive motors, a differential reduction gear and a torque limiter results in the actuator taking up a large amount of space.

The object of the invention is to provide an actuator provided with two motors, a differential reduction gear and a torque limiter which takes up less space.

To this end, the invention relates to an actuator of the above-mentioned type, characterised in that the torque limiter brings about the connection between the planet-carrying drum and the output shaft, which torque limiter is arranged between the two sun pinions on the axis of the output shaft.

According to specific embodiments, the actuator further comprises one or more of the following features:
the torque limiter comprises friction members, which are fixedly joined in terms of rotation to the output shaft and the planet-carrying drum, and means for clamping the friction members against each other;
the friction members have annular planar friction surfaces and the clamping means are suitable for applying a force for clamping the surfaces against each other in the direction of the output shaft;
the output shaft has an axial support and a threaded portion, on which a nut is screwed, and the friction members are engaged around the output shaft and are held clamped between the axial support and the nut;
at least one of the axial support and the nut is arranged outside the space defined between the two sun pinions and it comprises a spacer which is engaged around the shaft and which brings about the support of a friction member on at least one of the axial support and the nut and at least one sun pinion is mounted for rotation about that spacer;
the or each friction member which is fixedly joined in terms of rotation to the planet-carrying drum comprises a hub having radial projections for being fixedly joined to the planet carrier, delimiting between them openings for receiving the associated planet pinions of the same pair; and
the torque limiter comprises a single friction member which is fixedly joined in terms of rotation to the planet-carrying drum which is clamped between two friction members which are fixedly joined to the output shaft.

The invention will be better understood from a reading of the description below given purely by way of example and with reference to the drawings, in which FIG. 1 is a partially cut away perspective view of an actuator according to the invention;

Figure 1:
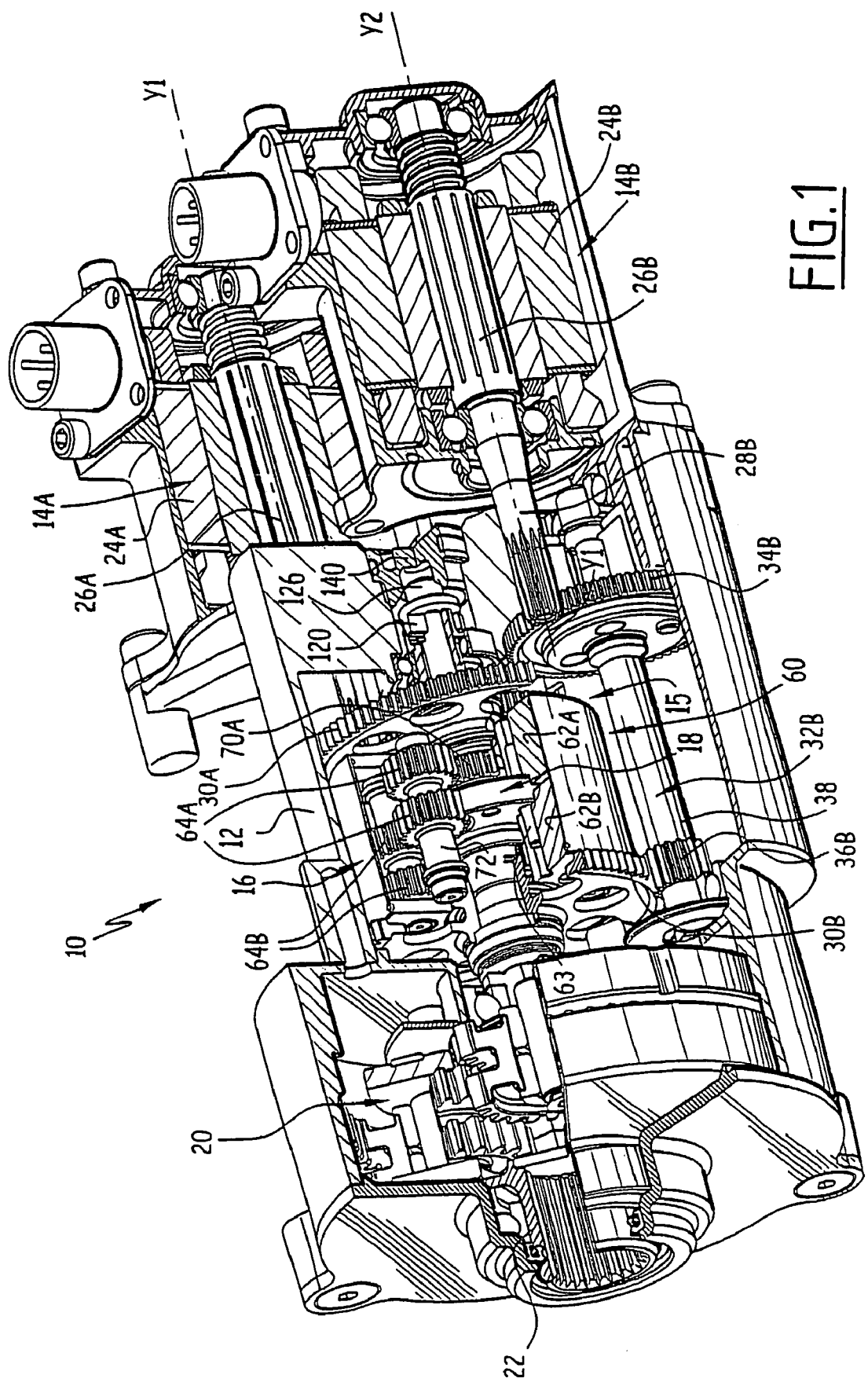

The actuator 10 illustrated in the Figures is intended for locking an aircraft undercarriage in a retracted position.

That actuator comprises a housing 12, inside which two drive motors 14A, 14B are arranged, each connected mechanically to a differential reduction gear and torque limiting mechanism 15. That mechanism comprises a differential reduction gear 16 which includes a torque limiter 18. The actuator further comprises an epicyclic reduction gear 20 which is driven by the mechanism 15 and a rotating output member 22 which protrudes from the housing 12 and which is itself driven by the epicyclic reduction gear 20.

In greater detail, the two motors 14A, 14B are constituted by electric motors, whose stators 24A, 24B are fixedly joined to the housing 12 and whose rotors 26A, 26B can rotate about axes Y1—Y1 and Y2—Y2 which extend parallel with each other.

The output shafts 28A, 28B of the motors drive the first and second motor sun pinions 30A, 30B of the differential reduction gear 16. Those motor sun pinions can rotate around the same principal axis X—X which extends parallel with axes Y1—Y1 and Y2—Y2 of the motors.

Figure 2:
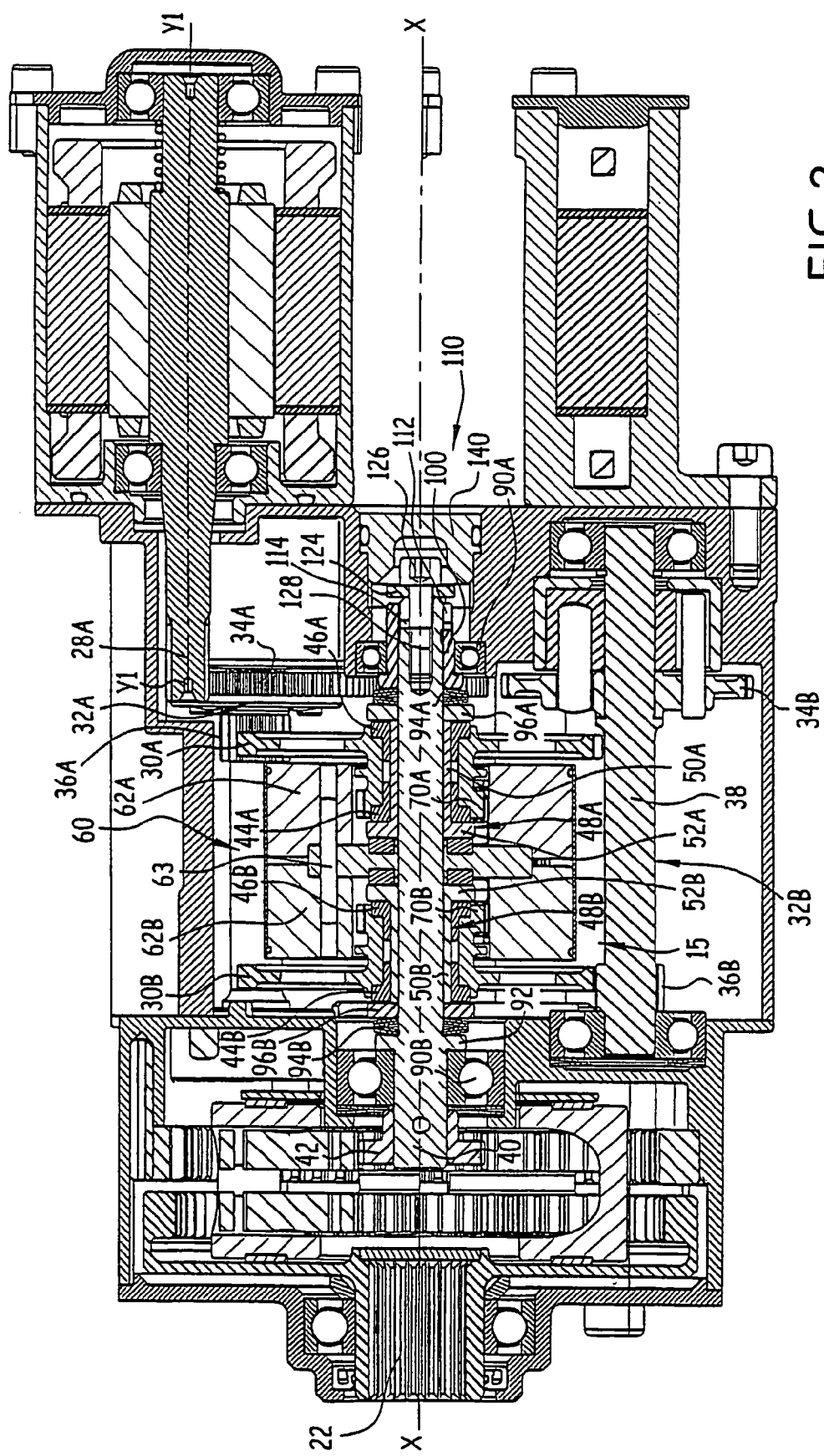
FIG. 2 is a longitudinal section of the actuator of FIG. 1.

As illustrated in FIG. 2, the output shaft 28A of the motor is coupled to the motor sun pinion 30A in order to be caused to rotate by a reduction step 32A which is constituted by two coaxial and fixedly joined pinions 34A, 36A having different diameters.

Similarly, as illustrated in FIG. 1, the output shaft 28B of the motor is coupled in terms of rotation to the motor sun pinion 30B by a reduction step 32B which is constituted by two coaxial pinions which have different diameters 34B, 36B and which are fixedly joined by a shaft 38.

Figure 3:
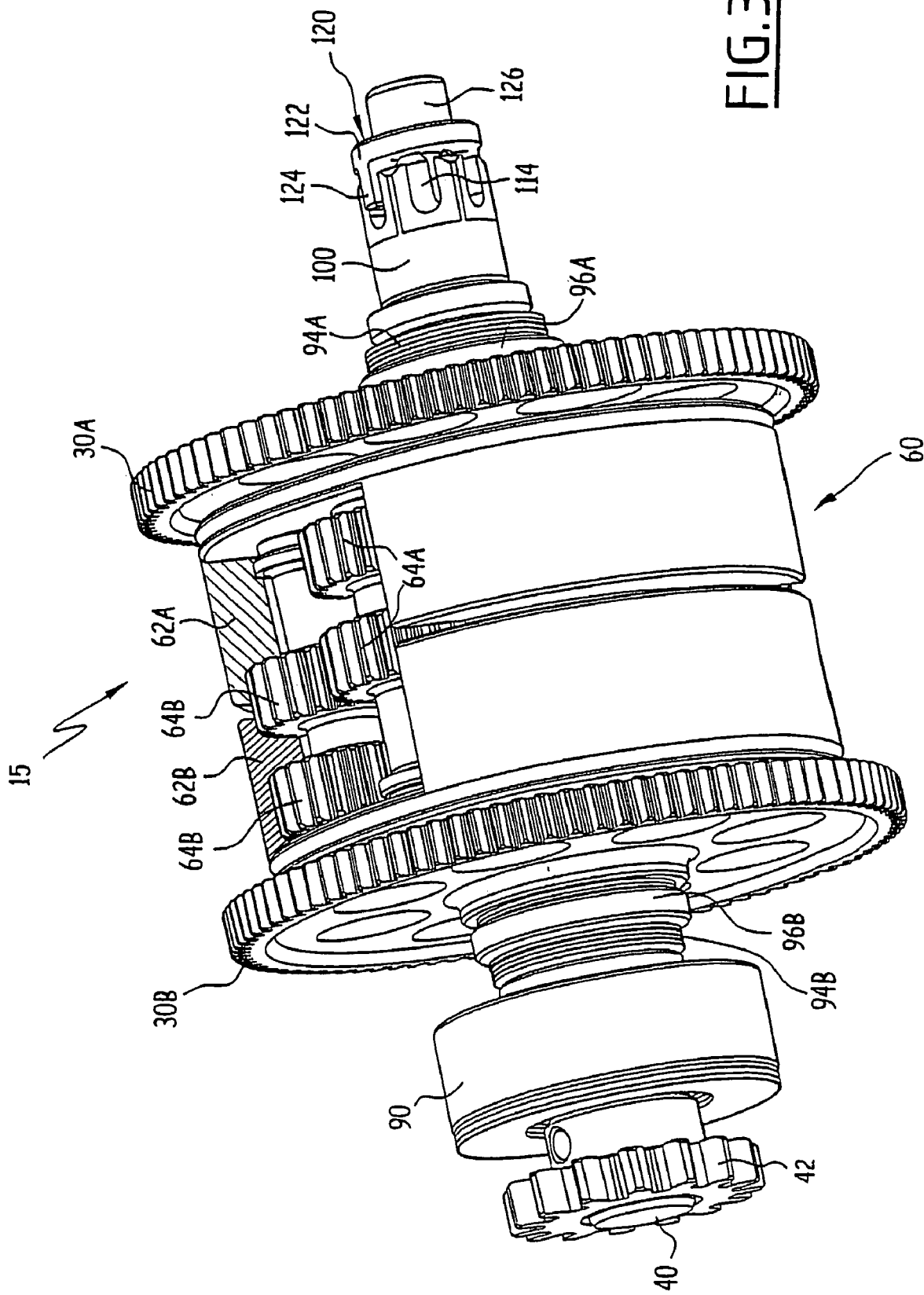
FIG. 3 is a partially cut away perspective view of the differential reduction gear and torque limiting mechanism of the actuator of FIGS. 1 and 2.
Figure 4:
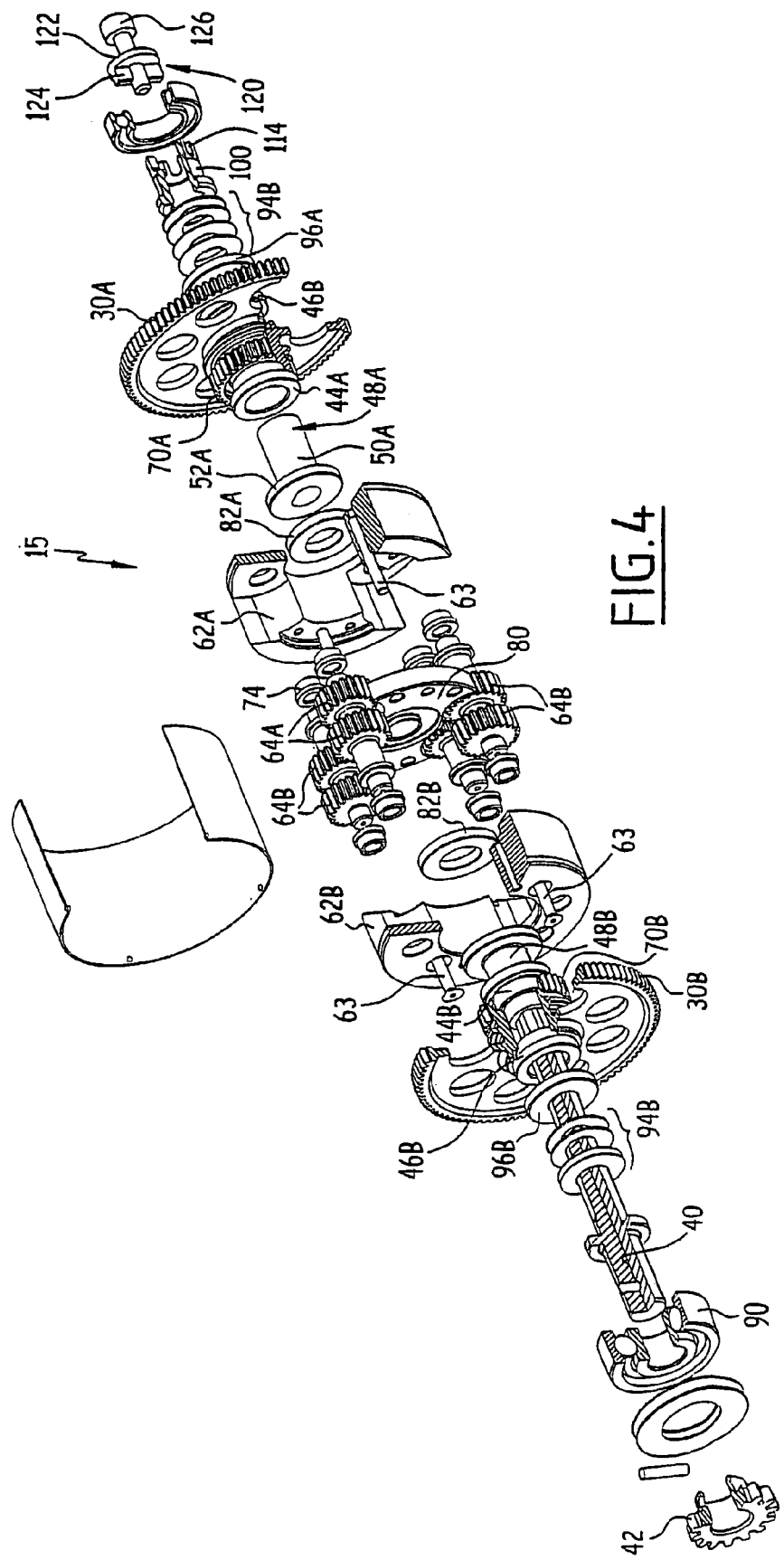
FIG. 4 is an exploded perspective view of the mechanism of FIG. 3.
Figure 5:
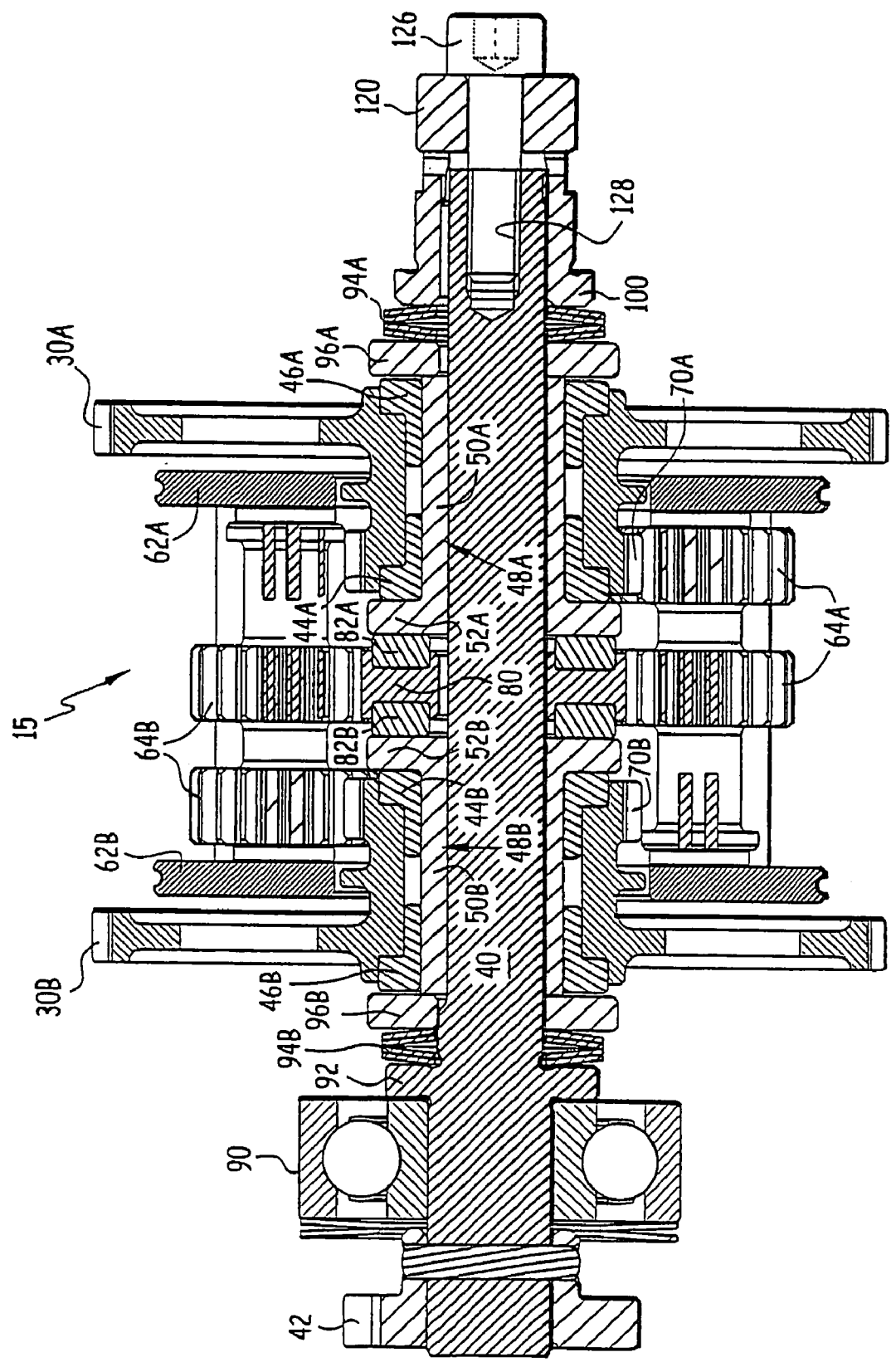
FIG. 5 is a longitudinal section of the mechanism illustrated in FIGS. 3 and 4.

The speed differential reduction gear and torque limiting mechanism 15 is illustrated alone in FIGS. 3 to 5. It has an output shaft 40 which extends along axis X—X. That shaft has, at a first end, an output pinion 42 which can drive the epicyclic reduction gear 20.

The two motor sun pinions 30A, 30B are mounted so as to rotate freely about the output shaft 40. The axes of the pinions 30A, 30B and the output shaft 40 are identical. The pinions 30A, 30B are supported by that shaft and are guided in rotation about the shaft by sliding bearings or rolling bearings 44A, 46A and 44B, 46B having lateral shoulders for axial retention.

Clamping jaws 48A, 48B are arranged between those bearings and the shaft 40. Those jaws are constituted by sleeves 50A, 50B which are extended at the facing ends thereof by integral collars 52A, 52B. The jaws 48A, 48B are connected in terms of rotation to the shaft 40, but are free to slide in translation along the length thereof. For this purpose, complementary profiles, such as flat portions, are provided on the outer surface of the shaft 40 and on the inner surface of the jaws 48A, 48B.

The differential reduction gear 16 comprises, between the two motor sun pinions 30A, 30B, a planet carrier 60 which is constituted by two end-plates 62A, 62B which are fixedly joined to each other in terms of rotation by pins and screws 63. Between the two end-plates 62A, 62B of the planet carrier there are mounted pairs of planet pinions 64A, 64B which engage with each other and each of which engages with a small driving sun pinion 70A, 70B which is fixedly joined to the motor sun pinion 30A and 30B, respectively.

Each planet pinion is in fact formed by two identical coaxial and integral gears which are carried by a shaft 72, with which they are integral.

The shafts 72 can rotate about themselves relative to the end-plates 62A, 62B, between which they are held by means of bearings 74. The shafts 72 extend parallel with each other and parallel with axis X—X of the output shaft 40. The axes of the shafts 72 are different from axis X—X so that the planet pinions 64A, 64B can rotate together as an assembly about axis X—X.

A hub 80 is fixedly joined in terms of rotation to the planet carrier 60 by the pins 63. This hub is mounted so as to be able to rotate about the shaft 40. It is arranged between the two motor sun pinions 30A, 30B. The hub 80 is more clearly visible in FIG. 4. It is of planar form with a generally annular core which is extended by two diametrically opposed lateral lugs, through which the pins 33 extend. The pinions 64A, 64B are arranged around the core in the openings provided between the lateral lugs.

The hub 80 comprises two friction discs 82A, 82B which are attached by means of adhesive bonding at the opposing planar surfaces thereof. They are held compressed between the collars 52A, 52B of the jaws 48A, 48B, those collars forming friction members which can co-operate with the friction discs over planar annular surfaces.

The output shaft 40 is supported by ball bearings 90A, 90B which are arranged at one side and the other of the mechanism 15. Those ball bearings are supported by the housing 12. The shaft 40 has a collar 92 which can be supported axially on the ball bearing 90 which is supported axially on a shoulder of the housing 12.

The hub 80 is clamped axially between the two jaws 48A, 48B. The jaw 48B is supported on the collar 92 by means of a stack of Belleville washers 94B and a rigid washer 96B.

The jaw 48A is pressed by a rigid washer 96A and a stack of Belleville washers 94A. That stack carried by the shaft 40 is held clamped by means of a nut 100 which is screwed and centred on the second end of the shaft 40 opposite that which presses against the pinion 42. The ball bearing 90A is engaged around that nut 100 over a length of the nut having a smooth surface at the outer side.

In that manner, the nut 100 brings about axial retention of the hub 80 which is clamped between the two jaws 48A, 48B. Those jaws 48A, 48B are urged towards each other by the Belleville washers 94A, 94B by means of the support washers 96A, 96B. The Belleville washers are held compressed at one side by the collar 92 and, at the other side, by the nut 100.

Depending on the tightening of the nut 100, the Belleville washers are compressed to a greater or lesser extent and the pressure which they apply to the jaws 48A, 48B can be adjusted in such a manner that the friction force between the jaws 48A, 48B and the friction discs 82A, 82B is modified.

In order to adjust the friction force, the housing 12 has an opening 110 which is provided in the extension of the output shaft 40 and which allows access to the nut 100 and allows it to be operated with a spanner. In order to bring about the securing of the nut, the shaft 40 has, at the second end thereof carrying the nut, transverse recesses 112 which open at the end of the shaft. There are, for example, three recesses. Corresponding recesses 112, 114 are provided in the nut 110. They also open at the end of the nut.

A locking member 120 which is constituted by a collar 122 which carries two locking fingers 124 is engaged at the end of the shaft in such a manner that the fingers are received in corresponding radial recesses which are provided at the end of the shaft 40 and in the nut 100.

A screw 126 is engaged in a threaded hole 128 which is provided axially at the end of the shaft. It extends through the locking member 120 and brings about its retention.

The opening 110 is closed by a removable and leak-tight protection plug 140.

The actuator operates as follows.

When the two motors rotate at the same speed, the two motor sun pinions 30A, 30B are driven in the same direction. In that manner, the associated planet pinions 64A, 64B of the same pair are stationary relative to each other. The planet carrier 60 is caused to rotate by the planet pinions which are themselves caused to rotate about shaft X—X by the driving sun pinions 70A, 70B.

The hub 80 is then caused to rotate with the planet carrier 60.

The torque provided by the motors is transmitted from the hub 80 to the shaft 40, as long as the friction force applied between the clamping jaws 48A, 48B and the friction discs 82A, 82B is greater than the torque provided by the motors.

If that torque provided by the motor is greater than the friction force applied by friction, the friction discs slide over the friction surfaces of the jaws in such a manner that only a portion of the torque is transmitted. Therefore, the hub clamped between the clamping members 48A, 48B forms a torque limiter which is interposed between the two motor sun pinions 30A, 30B.

If one of the motors rotates at a different speed relative to the other motor, or if one of the motors is stopped, the two driving sun pinions 70A, 70B rotate at different speeds so that the planet pinions 64A, 64B are caused to rotate about themselves in opposite directions, compensating for the difference in speed of rotation of the two motors. The planet carrier 60 is then driven at a mean speed between the speeds of the two motor sun pinions 30A, 30B, thus driving the shaft 40 at that speed as long as the torque provided by the motors is less than the friction torque applied by the friction surfaces in contact.

As known per se, the shaft 40 drives the control member 22 by means of the epicyclic reduction gear 20.

Since the torque limiter is interposed between the two motor sun pinions 30A, 30B, the space taken up by the reduction gear and torque limiting mechanism is reduced, which allows an actuator to be produced which generally takes up little space.

In order to bring about the adjustment of the torque limiter, the plug 110 is removed, thereby allowing access to the screw 126. The screw 126 is removed, as well as the locking member 120. The nut 100 is screwed or unscrewed in order to bring about a suitable clamping force for the two jaws 48A, 48B on the friction discs 82A, 82B.

After the position of the nut has been adjusted, the locking member 120 is re-engaged in corresponding recesses 114, 116 of the nut and the end of the shaft, and the screw 126 is re-tightened in order to bring about axial retention of the locking member 120. Finally, the plug 140 is re-positioned in order to ensure the leak-tightness of the housing.

It will thus be appreciated that, in such an actuator, the torque limiter can be calibrated after the actuator assembly has been assembled, thereby allowing consideration to be given to friction and losses of efficiency caused by the various engaged elements which constitute the actuator, and in particular the pinions of the epicyclic reduction gear 20. In that manner, the maximum output torque of the actuator measured at the output member 22 can be defined precisely, whatever the machining quality of the various moving elements of the actuator.

What is claimed is:

1. Actuator comprising:
   two drive motors (14A, 14B),
   an output member (22),
   a differential reduction gear (16) having straight-cut teeth which is interposed between the two motors (14A, 14B) and the output member (22), the differential reduction gear (16) comprising:
      two sun pinions (30A, 70A, 30B, 70B), each sun pinion being rotatably coupled to a drive motor (14A, 14B),
      an output shaft (40), about which the axes of the sun pinions (30A, 70A, 30B, 70B) are rotatably mounted,
      a planet-carrying drum (60) which is connected to the output shaft (40) in order to be rotatably driven,
      at least one pair of planet pinions (64A, 64B) which are carried by the planet-carrying drum (60) and which are mounted so as to rotate about themselves, each planet pinion (64A, 64B) being engaged with a sun pinion (30A, 70A, 30B, 70B), the associated planet pinions (64A, 64B) of the same pair being engaged with each other,
   a torque limiter (18) which is interposed between the two motors (14A, 14B) and the output member (22), characterised in that the torque limiter (18) brings about the connection between the planet-carrying drum (60) and the output shaft (40), which torque limiter (18) is arranged between the two sun pinions (30A, 70A, 30B, 70B) on the axis of the output shaft (40).

2. Actuator according to claim 1, characterised in that the torque limiter (18) comprises friction members (80, 82A, 82B, 52A, 52B), which are fixedly joined in terms of rotation to the output shaft (40) and the planet-carrying drum (60), and means (92, 94A, 94B, 100) for clamping the friction members (80, 82A, 82B, 52A, 52B) against each other.

3. Actuator according to claim 2, characterised in that the friction members (82A, 82B, 52A, 52B) have annular planar friction surfaces, and in that the clamping means (92, 94A, 94B, 100) are suitable for applying a force for clamping the surfaces against each other in the direction of the output shaft (40).

4. Actuator according to claim 3, characterised in that the output shaft (40) has an axial support (92) and a threaded portion, on which a nut (100) is screwed, and in that the friction members (80, 82A, 82B, 52A, 52B) are engaged around the output shaft (40) and are held clamped between the axial support (92) and the nut (100).

5. Actuator according to claim 4, characterised in that at least one of the axial support (92) and the nut (100) is arranged outside the space defined between the two sun pinions (30A, 70A, 30B, 70B), in that it comprises a spacer (50A, 50B) which is engaged around the shaft and which brings about the support of a friction member (52A, 52B) on at least one of the axial support (92) and the nut (100), and in that at least one sun pinion (30A, 70A, 30B, 70B) is mounted for rotation about that spacer (50A, 50B).

6. Actuator according to claim 2, characterised in that the or each friction member (82A, 82B) which is fixedly joined in terms of rotation to the planet-carrying drum (60) comprises a hub (80) having radial projections for being fixedly joined to the planet carrier (60), delimiting between them openings for receiving the associated planet pinions of the same pair.

7. Actuator according to claim 3, characterised in that the torque limiter (18) comprises a single friction member (82A, 82B) which is fixedly joined in terms of rotation to the planet-carrying drum (60) which is clamped between two friction members (52A, 52B) which are fixedly joined to the output shaft (40).

8. Actuator according to claim 3, characterised in that the or each friction member (82A, 82B) which is fixedly joined in terms of rotation to the planet-carrying drum (60) comprises a hub (80) having radial projections for being fixedly joined to the planet carrier (60), delimiting between them openings for receiving the associated planet pinions of the same pair.

9. Actuator according to claim 4, characterised in that the or each friction member (82A, 82B) which is fixedly joined in terms of rotation to the planet-carrying drum (60) comprises a hub (80) having radial projections for being fixedly joined to the planet carrier (60), delimiting between them openings for receiving the associated planet pinions of the same pair.

10. Actuator according to claim 5, characterised in that the or each friction member (82A, 82B) which is fixedly joined in terms of rotation to the planet-carrying drum (60) comprises a hub (80) having radial projections for being fixedly joined to the planet carrier (60), delimiting between them openings for receiving the associated planet pinions of the same pair.

11. Actuator according to claim 4, characterised in that the torque limiter (18) comprises a single friction member (82A, 82B) which is fixedly joined in terms of rotation to the planet-carrying drum (60) which is clamped between two friction members (52A, 52B) which are fixedly joined to the output shaft (40).

12. Actuator according to claim 5, characterised in that the torque limiter (18) comprises a single friction member (82A, 82B) which is fixedly joined in terms of rotation to the planet-carrying drum (60) which is clamped between two friction members (52A, 52B) which are fixedly joined to the output shaft (40).

13. Actuator according to claim 6, characterised in that the torque limiter (18) comprises a single friction member (82A, 82B) which is fixedly joined in terms of rotation to the planet-carrying drum (60) which is clamped between two friction members (52A, 52B) which are fixedly joined to the output shaft (40).

* * * * *